United States Patent
Bakhuis et al.

(10) Patent No.: US 8,402,652 B2
(45) Date of Patent: Mar. 26, 2013

(54) METHODS OF MAKING WIND TURBINE ROTOR BLADES

(75) Inventors: Jan Willem Bakhuis, Nijverdal (NL); Andrew Billen, Daarlerveen (NL); Sjef Van Breugel, Enschede (NL); Jamie Livingston, Pensacola, FL (US)

(73) Assignee: General Electric Company, Schenectady, NY (US)

( * ) Notice: Subject to any disclaimer, the term of this patent is extended or adjusted under 35 U.S.C. 154(b) by 1862 days.

(21) Appl. No.: 11/261,028

(22) Filed: Oct. 28, 2005

(65) Prior Publication Data

US 2007/0107220 A1    May 17, 2007

(51) Int. Cl.
*B21D 53/78* (2006.01)
(52) U.S. Cl. .................. 29/889.71; 29/889.7
(58) Field of Classification Search .......... 29/889.7, 29/889.71; 416/244; 264/257, 258, 260
See application file for complete search history.

(56) References Cited

U.S. PATENT DOCUMENTS

| | | | |
|---|---|---|---|
| 4,562,033 A | 12/1985 | Johnson | |
| 6,843,953 B2 | 1/2005 | Filsinger et al. | |
| 2003/0011094 A1 | 1/2003 | Filsinger et al. | |
| 2004/0253114 A1 * | 12/2004 | Gunneskov et al. | 416/224 |

FOREIGN PATENT DOCUMENTS

| | | |
|---|---|---|
| CN | 1644917 A | 7/2005 |
| EP | 1310351 A1 | 5/2003 |
| GB | 2124130 A | 2/1984 |

OTHER PUBLICATIONS

University of Delaware Center for Composite Materials, "CompositeTechBrief," 2 pgs., 2004, University of Delaware.
Chinese Patent Office, First Office Action and Text of First Office Action for Patent Application 2006/10142878.4, Nov. 27, 2009, 7 pages.
European Search Report, dated Oct. 23, 2012, for co-pending EP patent application No. EP 06255504 (8 pgs).

* cited by examiner

*Primary Examiner* — David Bryant
*Assistant Examiner* — Ryan J Walters
(74) *Attorney, Agent, or Firm* — James McGinness, Esq.; Armstrong Teasdale LLP

(57) ABSTRACT

A method of manufacturing a wind turbine rotor blade includes, in one embodiment, the steps of providing a core, and applying at least one reinforcing skin to the core to form a blade subassembly. Each reinforcing skin is formed from a mat of reinforcing fibers. The method also includes applying a micro-porous membrane over the at least one reinforcing skin, applying a vacuum film over the micro-porous membrane, introducing a polymeric resin to the core, infusing the resin through the core and through the at least one reinforcing skin by applying a vacuum to the blade assembly, and curing the resin to form the rotor blade.

15 Claims, 2 Drawing Sheets

METHODS OF MAKING WIND TURBINE ROTOR BLADES

BACKGROUND OF THE INVENTION

This invention relates generally to wind turbines, and more particularly to methods of fabricating wind turbine rotor blades utilizing a micro-porous membrane.

Recently, wind turbines have received increased attention as an environmentally safe and relatively inexpensive alternative energy source. With this growing interest, considerable efforts have been made to develop wind turbines that are reliable and efficient.

Generally, a wind turbine includes a rotor having multiple blades. The rotor is mounted on a housing or nacelle, which is positioned on top of a truss or tubular tower. Utility grade wind turbines (i.e., wind turbines designed to provide electrical power to a utility grid) can have large rotors (e.g., 30 or more meters in diameter). Blades on these rotors transform wind energy into a rotational torque or force that drives one or more generators, rotationally coupled to the rotor through a gearbox or directly coupled to the rotor. The gearbox, when present, steps up the inherently low rotational speed of the turbine rotor for the generator to efficiently convert mechanical energy to electrical energy, which is fed into a utility grid.

Known wind turbine blades are fabricated by infusing a resin into a fiber wrapped core. A layer of distribution mesh is used to feed resin into the core material. The infusion flow front is controlled by breaks in the distribution mesh which require exact positioning for the desired results. Also, the distribution mesh is discarded along with the resin that is retained in the mesh, about 650 grams per square meter.

BRIEF DESCRIPTION OF THE INVENTION

In one aspect, a method of manufacturing a wind turbine rotor blade is provided. The method includes the steps of providing a core and applying at least one reinforcing skin to the core to form a blade subassembly. Each reinforcing skin is formed from a mat of reinforcing fibers. The method also includes applying a micro-porous membrane over the at least one reinforcing skin, applying a vacuum film over the micro-porous membrane, introducing a polymeric resin to the core, infusing the resin through the core and through the at least one reinforcing skin by applying a vacuum to the blade assembly, and curing the resin to form the rotor blade.

In another aspect, a method of manufacturing a wind turbine rotor blade is provided. The method includes the steps of providing a core, applying at least one reinforcing skin to the core to form a blade subassembly, and positioning the blade subassembly in a mold. Each reinforcing skin is formed from a mat of reinforcing fibers. The method also includes applying a micro-porous membrane over the at least one reinforcing skin, applying a vacuum film over the micro-porous membrane, introducing a polymeric resin to the core, infusing the resin through the core and through the at least one reinforcing skin by applying a vacuum to the blade assembly, and curing the resin to form the rotor blade.

DETAILED DESCRIPTION OF THE INVENTION

A method of fabricating a wind turbine rotor blade utilizing a micro-porous membrane is described below in detail. The micro-porous membrane prohibits the passage of resins while permitting gas to pass through. This permits a vacuum to be applied to the entire rotor blade rather than peripherally as in known processes. The micro-porous membrane also facilitates a controlled flow front and eliminates any race-tracking of the resin flow. Cycle time along with labor time is reduced along with a reduction in the cost of process consumable materials. The use of the micro-porous membrane provides improved blade quality, for example, lower void content and optimized reinforcing fiber to resin ratios.

Figure 1:
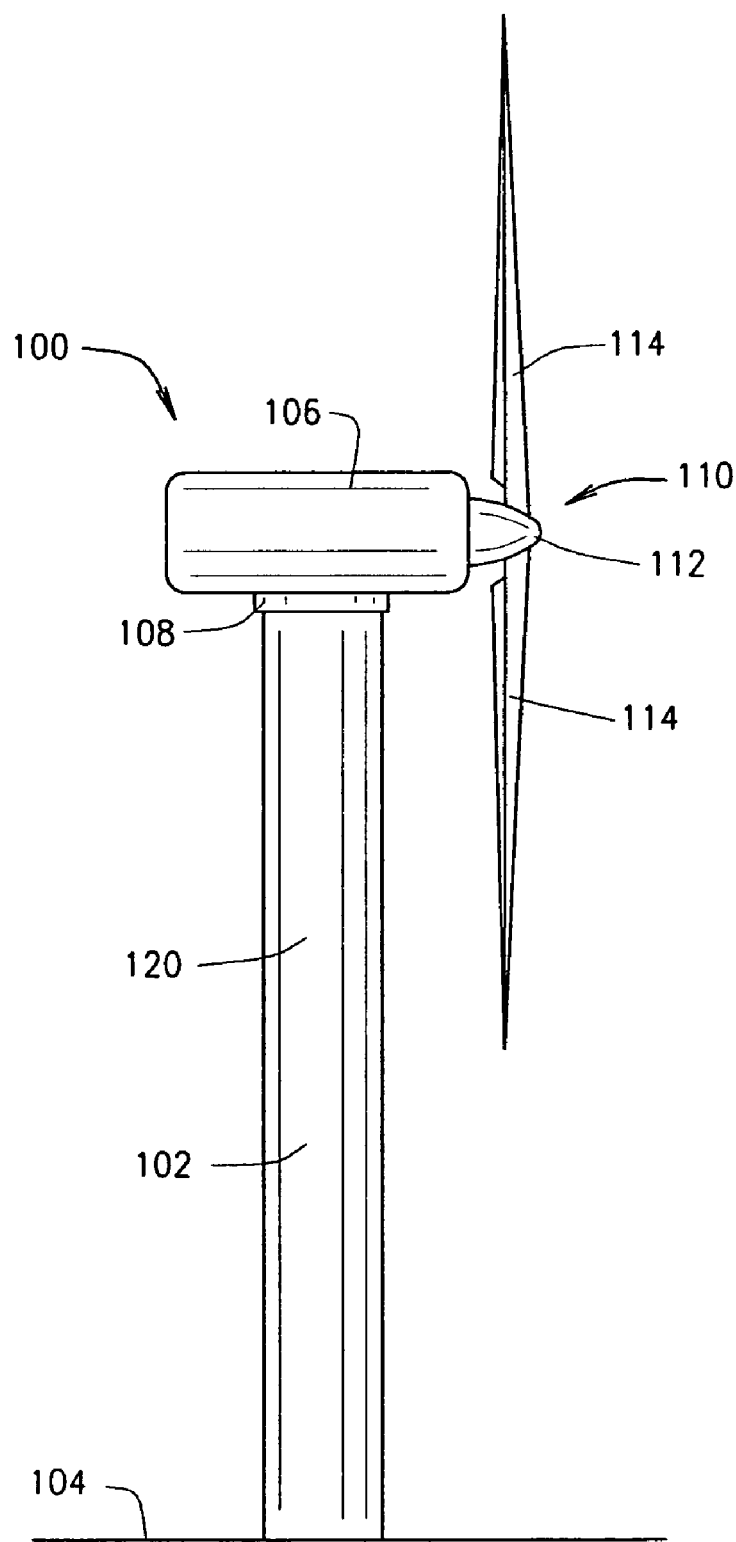
FIG. 1 is a side elevation schematic illustration of an exemplary configuration of a wind turbine.

Referring to the drawings, FIG. 1 is a side elevation schematic illustration of a wind turbine 100, such as, for example, a horizontal axis wind turbine. Wind turbine 100 includes a tower 102 extending from a supporting surface 104, a nacelle 106 mounted on a bedframe 108 of tower 102, and a rotor 110 coupled to nacelle 106. Rotor 110 includes a hub 112 and a plurality of rotor blades 114 coupled to hub 112. In the exemplary embodiment, rotor 110 includes three rotor blades 114. In an alternative embodiment, rotor 110 includes more or less than three rotor blades 114. In the exemplary embodiment, tower 102 is fabricated from tubular steel and includes a cavity 120 extending between supporting surface 104 and nacelle 106. In an alternate embodiment, tower 102 is a lattice tower.

Various components of wind turbine 100, in the exemplary embodiment, are housed in nacelle 106 atop tower 102 of wind turbine 100. The height of tower 102 is selected based upon factors and conditions known in the art. In some configurations, one or more microcontrollers in a control system are used for overall system monitoring and control including pitch and speed regulation, high-speed shaft and yaw brake application, yaw and pump motor application and fault monitoring. Alternative distributed or centralized control architectures are used in alternate embodiments of wind turbine 100. In the exemplary embodiment, the pitches of blades 114 are controlled individually. Hub 112 and blades 114 together dorm wind turbine rotor 110. Rotation of rotor 110 causes a generator (not shown in the figures) to produce electrical power.

In use, blades 114 are positioned about rotor hub 112 to facilitate rotating rotor 110 to transfer kinetic energy from the wind into usable mechanical energy. As the wind strikes blades 114, and as blades 114 are rotated and subjected to centrifugal forces, blades 114 are subjected to various bending moments. As such, blades 114 deflect and/or rotate from a neutral, or non-deflected, position to a deflected position. Moreover, a pitch angle of blades 114 can be changed by a pitching mechanism (not shown) to facilitate increasing or decreasing blade 114 speed, and to facilitate reducing tower 102 strike.

Figure 2:
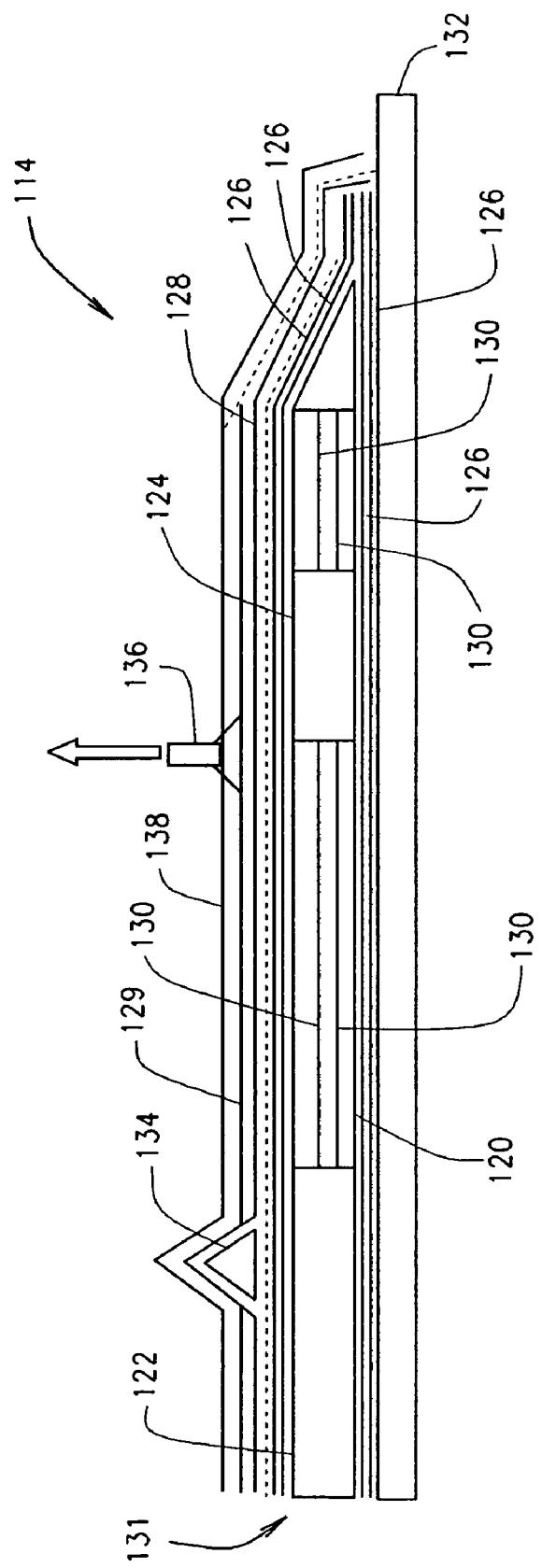
FIG. 2 is a side schematic illustration of the wind turbine rotor blade shown in FIG. 1.

Referring also to FIG. 2, blade 114 includes a core 120 that is formed from a polymeric foam, wood, and/or a metal honeycomb. A main spar 122 and an end spar 124 are embedded in core 120. Examples of suitable polymeric foams include, but are not limited to, PVC foams, polyolefin foams, epoxy foams, polyurethane foams, polyisocyanurate foams, and mixtures thereof. Core 120 is wrapped with at least one reinforcing skin 126. Each reinforcing skin 126 is formed from a mat of reinforcing fibers. Particularly, the mat is woven mat of reinforcing fibers or a non-woven mat of reinforcing fibers. Examples of suitable reinforcing fibers include, but are not limited to, glass fibers, graphite fibers, carbon fibers, polymeric fibers, ceramic fibers, aramid fibers, kenaf fibers, jute fibers, flax fibers, hemp fibers, cellulosic fibers, sisal fibers, coir fibers and mixtures thereof.

A resin is infused into core 120 and reinforcing skins 126 to provide integrity and strength to blade 114. Examples of suitable resins include, but are not limited to, vinyl ester resins, epoxy resins, polyester resins, and mixtures thereof. A micro-porous membrane 128 is applied to the outer surface of blade 114 to facilitate the resin infusion process. The resin is introduced into core 120 under a vacuum. The vacuum causes the resin to flow through core 120 and reinforcing skins 126. Micro-porous membrane 128 permits air that is displaced by the resin to escape from core 120 and reinforcing skins 126. However, micro-porous membrane 128 does not permit the resin to pass through membrane 128. Micro-porous membrane 128, in one exemplary embodiment, has an average pore size of about 0.01 micrometer (μm) to about 10 μm, and in another embodiment, from about 0.1 μm to about 5 μm. Micro-porous membrane 128 is formed from, for example, polytetrafluoroethylene, polyolefin, polyamide, polyester, polysulfone, polyether, acrylic and methacrylic polymers, polystyrene, polyurethane, polypropylene, polyethylene, polyphenelene sulfone, and mixtures thereof. In one embodiment, micro-porous membrane 128 also includes a backing material laminated to one surface. The backing material is formed from polymeric fibers, for example, polyester fibers, nylon fibers, polyethylene fibers and mixtures thereof. An air transporter material 129 is positioned over micro-porous membrane 128 to assist in degassing core by permitting air displaced by the infused resin to escape to the atmosphere. Air transporter material 129 can be formed from any suitable mesh material, for example, a polyethylene mesh.

In the exemplary embodiment, core 120 includes a plurality of grooves 130 to facilitate the flow of resin through core 120. In alternate embodiments, core 120 does not include grooves 130.

To form rotor blade 114, reinforcing skins 126 are wrapped around core 120 to form a blade subassembly 131 that is then positioned in a mold 132. In alternate embodiments mold 132 is not used. A resin infusion input connection 134 is positioned adjacent the outer reinforcing skin 126. Micro-porous membrane 128 is then positioned over the outer reinforcing skin 126 and resin infusion input connection. Air transporter material 129 is then positioned over micro-porous membrane 128, and a vacuum connection 136 is positioned adjacent air transporter material 129. A vacuum film 138 formed from a suitable material, for example, a polyamid, is positioned over air transporter material 129 with vacuum connection extending through vacuum film 138. The resin is introduced into core 120 and reinforcing skins 126 through input connection 134 while a vacuum is established through vacuum connection 136. The vacuum facilitates resin flow and infuses the resin into core 120 and reinforcing skins 126. Micro porous membrane 128 prevents the resin from flowing away from core 120 and reinforcing skins 126 while permitting air displaced by the infused resin to escape to the atmosphere. The resin is then cured and resin input connection 134, vacuum connection 136, air transporter material 129, and vacuum film 138 are removed from blade 114.

While the invention has been described in terms of various specific embodiments, those skilled in the art will recognize that the invention can be practiced with modification within the spirit and scope of the claims.

What is claimed is:

1. A method of manufacturing a wind turbine rotor blade comprising:
providing a core;
applying at least one reinforcing skin to the core, each reinforcing skin comprising a mat of reinforcing fibers to form a blade subassembly;
applying a micro-porous membrane over the at least one reinforcing skin;
applying a vacuum film over the micro-porous membrane;
introducing a polymeric resin to the core between the micro-porous membrane and the at least one reinforcing skin;
infusing the resin through the core and through the at least one reinforcing skin by applying a vacuum to the blade subassembly; and
curing the resin to form the rotor blade.

2. A method in accordance with claim 1 wherein providing a core comprises providing a core comprising a plurality of grooves to permit the resin to flow through the core.

3. A method in accordance with claim 1 wherein the reinforcing fibers comprise at least one of glass fibers, graphite fibers, carbon fibers, ceramic fibers aramid fibers, kenaf fibers, jute fibers, flax fibers, hemp fibers, cellulosic fibers, sisal fibers, and coir fibers.

4. A method in accordance with claim 1 further comprising applying an air transporter material layer between the vacuum film and the micro-porous membrane.

5. A method in accordance with claim 4 further comprising positioning a vacuum connection adjacent the air transporter material layer.

6. A method in accordance with claim 5 wherein introducing a polymeric resin to the core further comprises introducing a polymeric resin to the core while a vacuum is established through the vacuum connection.

7. A method in accordance with claim 5 wherein applying a vacuum to the blade subassembly further comprises applying a vacuum to the blade subassembly through the vacuum connection.

8. A method in accordance with claim 5 wherein positioning a vacuum connection further comprises positioning the vacuum connection through the vacuum film.

9. A method in accordance with claim 1 wherein the resin comprises at least one of vinyl ester resins, epoxy resins, and polyester resins.

10. A method in accordance with claim 1 wherein the core comprises at least one of a polymeric foam, wood, and a metal honycomb.

11. A method in accordance with claim 1 wherein the micro-porous membrane comprises at least one of polytetrafluoroethylene, polyolefin, polyamide, polyester, polysulfone, polyether, acrylic and methacrylic polymers, polystyrene, polyurethane, polypropylene, polyethylene, and polyphenelene sulfone.

12. A method in accordance with claim 1 wherein said micro-porous membrane comprises a plurality of pores having an average diameter of about 0.01 μm to about 10 μm.

13. A method in accordance with claim 1 wherein said micro-porous membrane comprises a plurality of pores having an average diameter of about 0.1 μm to about 5 μm.

14. A method in accordance with claim 1 wherein the micro-porous membrane comprises a backing material on one surface.

15. A method in accordance with claim 1 further comprising positioning a resin infusion input connection adjacent the at least one reinforcing skin.

* * * * *